United States Patent [19]
Menke

[11] Patent Number: 6,053,680
[45] Date of Patent: Apr. 25, 2000

[54] SLEEVE NUT

[76] Inventor: Manfred Menke, Struckenbergstr. 28c, 27721 Ritterhude, Germany

[21] Appl. No.: 09/249,975

[22] Filed: Feb. 12, 1999

[30] Foreign Application Priority Data

Feb. 16, 1998 [DE] Germany .......................... 198 05 998

[51] Int. Cl.[7] .............................. F16B 37/12; F16B 39/10
[52] U.S. Cl. ........................... 411/178; 411/112; 411/123
[58] Field of Search .................... 411/111–113, 122–124, 411/173, 178

[56] References Cited

U.S. PATENT DOCUMENTS

| 930,806 | 8/1909 | Smith ....................................... 411/123 |
| 1,321,742 | 11/1919 | Hendricks ............................ 411/178 X |
| 1,327,435 | 1/1920 | Kurtz ....................................... 411/123 |
| 2,392,714 | 1/1946 | Zerbe ....................................... 411/123 |
| 4,043,239 | 8/1977 | DeFusco .............................. 411/178 X |
| 4,295,765 | 10/1981 | Burke .................................. 411/178 X |

FOREIGN PATENT DOCUMENTS 1 123 524   2/1962   Germany .

*Primary Examiner*—Neill Wilson
*Attorney, Agent, or Firm*—McGlew and Tuttle, P.C.

[57] ABSTRACT

A sleeve nut includes a nut (1) and a screw like sleeve (2) screwed into that nut, thereby fixing the sleeve nut to a component (7) of e.g. an aircraft, a car or the like. Between the component (7) and the nut (1) a socle (3) is inserted having at least one upright tongue (22). This socle (3) is locked against rotation with respect to the component (7). Furthermore the nut (1) is positively locked against rotation at the socle (3) by flats (21) or edges there-between respectively with the tongue (22) of the socle (3).

20 Claims, 4 Drawing Sheets

SLEEVE NUT

FIELD OF THE INVENTION

The present invention pertains a so-called sleeve nut having a nut connected through a sleeve to a component part. Such sleeve nuts are used whenever the thickness of a component of a construction is not sufficient to cut a female thread into it and whenever no access to the nut with a wrench is possible. For example in aircrafts hundreds of such sleeve nuts are needed. But also for cars, ships, switchboards and other products they are required. In general these sleeve nuts as part of the screw connection have to be fixed to the component and stay there even after removing the screw. The design of these nuts in general has to ensure that certain movement in the plane of the component is possible to allow an adjustment of the nut to a bore hole of a second component. Also it is necessary that the sleeve nuts are secured against drop off and locked against rotation while the screw is screwed in. The possibility of exchangeability of the nut and the security against working loose are further objects of such sleeve nut connections.

BACKGROUND OF THE INVENTION

Such sleeve nuts are known in various forms. Some are connected with other components by rivets or adhesive; others are pressed into the component. DE 1 123 524 discloses two embodiments of a sleeve nut where a common hexagon nut is fixed to a rivet inserted into a bore hole of a component. The rivet secures the nut against drop off and locks it against rotation. According to the first embodiment the rivet contains a cage into which the hexagonal nut is inserted and positively held. According to the second embodiment the hexagonal nut is glued to the rivet. While the screw is screwed into the nut the nut is only locked against rotation by friction of the rivet in its bore hole. Furthermore special tools are needed to fix the rivet to the component.

SUMMARY AND OBJECTS OF THE INVENTION

The primary object of the invention is to achieve a sleeve nut which is safely locked against rotation while a screw is screwed in, safely secured against drop off and which is easily to mount to a component.

According to the invention the sleeve nut comprises a nut into which a sleeve is screwed in. The sleeve has a head so that the nut and the sleeve are held in a bore hole of the component by a screw connection. The sleeve nut is therefore safely secured against dropping off from the component. Between the nut and the component a socle is inserted which is locked against rotation with respect to the component. The nut itself is positively locked against rotation at the socle. Because of this design of the sleeve nut according to the invention the torsional stress on the socle while a screw is screwed into the sleeve is minimized. Furthermore no special tool is required to mount the sleeve nut to a component. The sleeve has to be screwed into the nut only by hand. The sleeve is finally screwed into the nut and spanned when a screw is screwed into the sleeve.

The socle preferably has at least one upright tongue. This upright tongue positively locking the nut against rotation by blocking upright flats (flat portions) of the nut. The socle further may have a second tongue. Half of the width across corners of the nut may be greater than the distance between a center line of the nut and the tongue.

According to a first embodiment of the invention this tongue positively locks the socle against rotation with respect to the component. According to an other embodiment this tongue is also an upright tongue opposed to the first tongue whereby the width across corners of the nut is greater than the with between the two opposed tongues.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
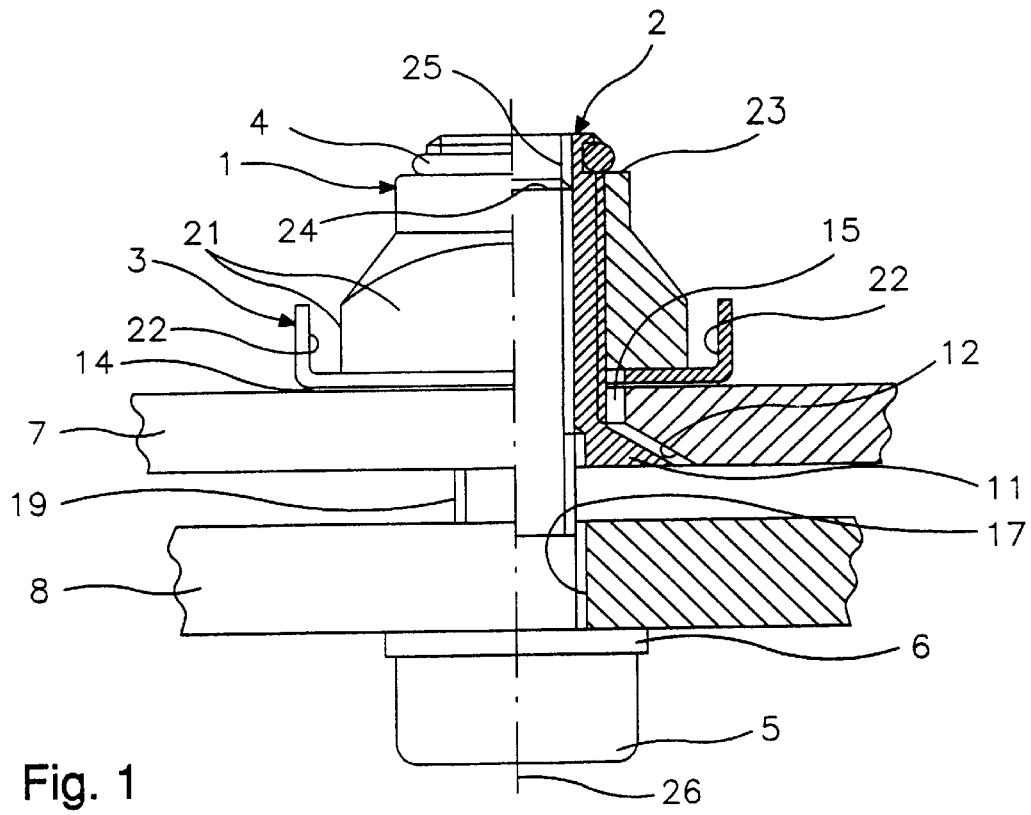
FIG. 1 is a cross sectional view of a first embodiment of a screw connection with a sleeve nut having the features according to the present invention not finally screwed.

Referring to the drawings in particular, in FIG. 1 to 4 the plate like components 7 and 8 are connected by a screw connection. This screw connection consists of a screw 5 with a supporting washer 6 and a sleeve nut comprising a sleeve 2 screwed into a nut 1. The sleeve 2 is screwed with its male tread 10 into the female thread 9 of nut 1.

Figure 2:
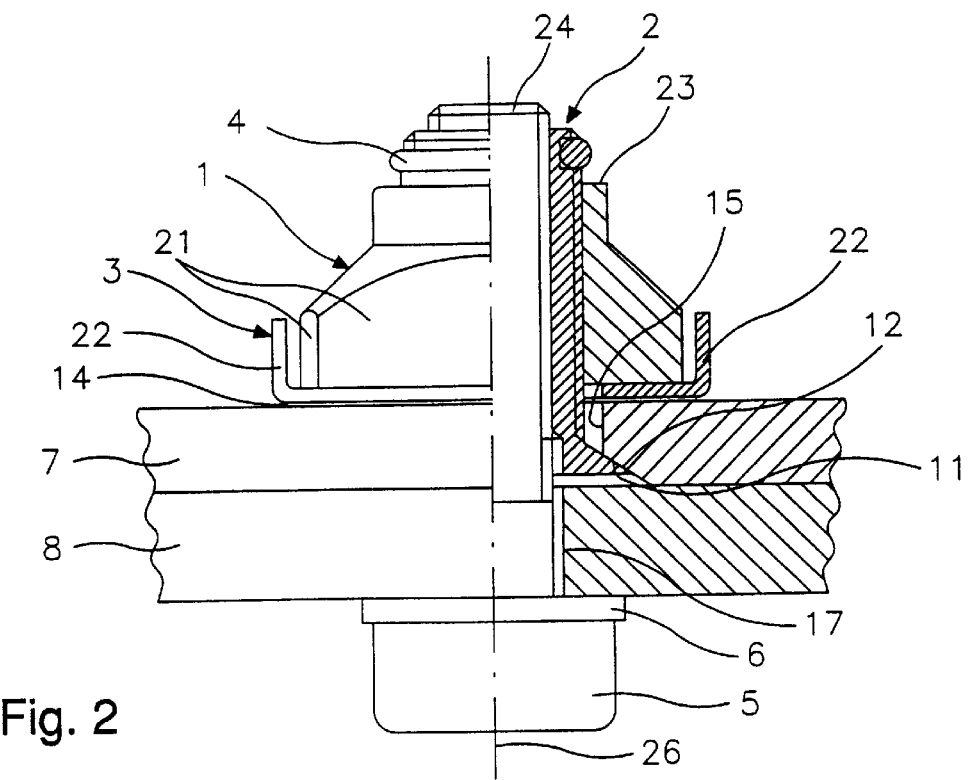
FIG. 2 is a cross sectional view of the screw connection of FIG. 1 finally screwed.
Figure 3:
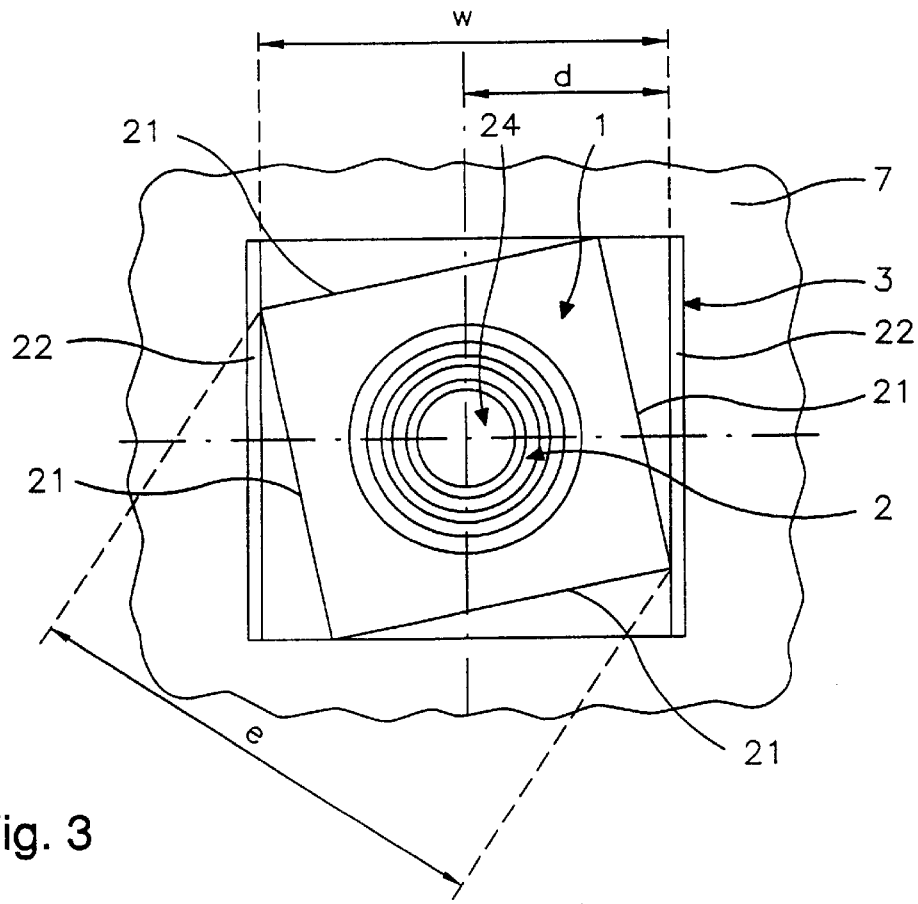
FIG. 3 is a top view of the screw connection of FIG. 1 finally screwed.
Figure 4:
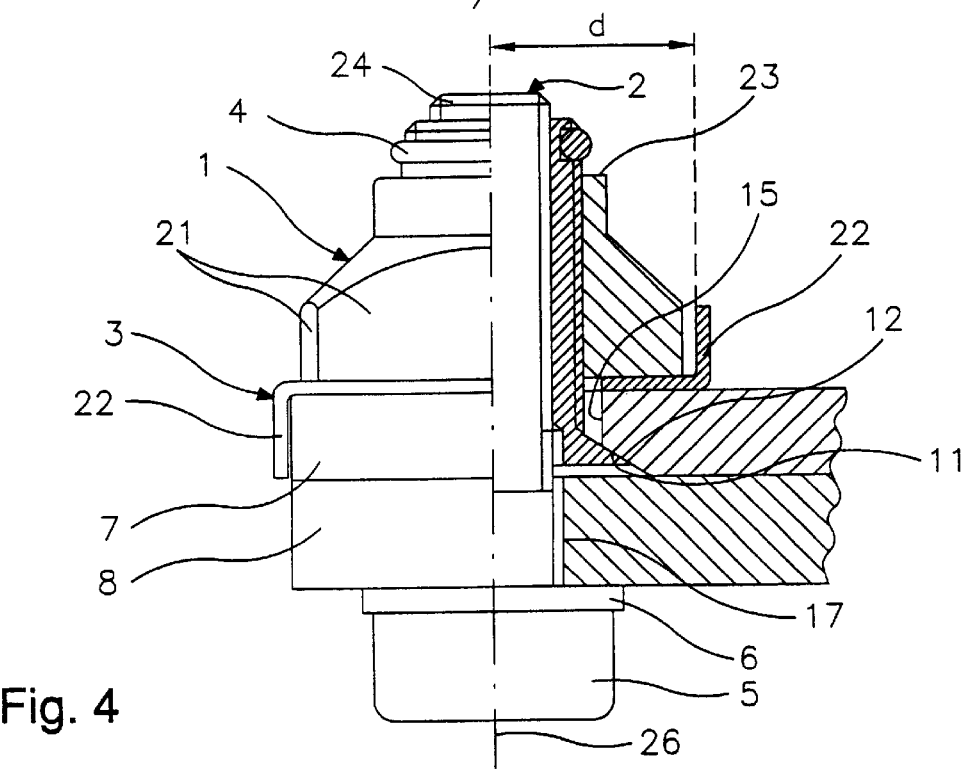
FIG. 4 is a cross sectional view of an other embodiment of a screw connection with a sleeve nut having the features according to the present invention finally screwed.
Figure 4A:
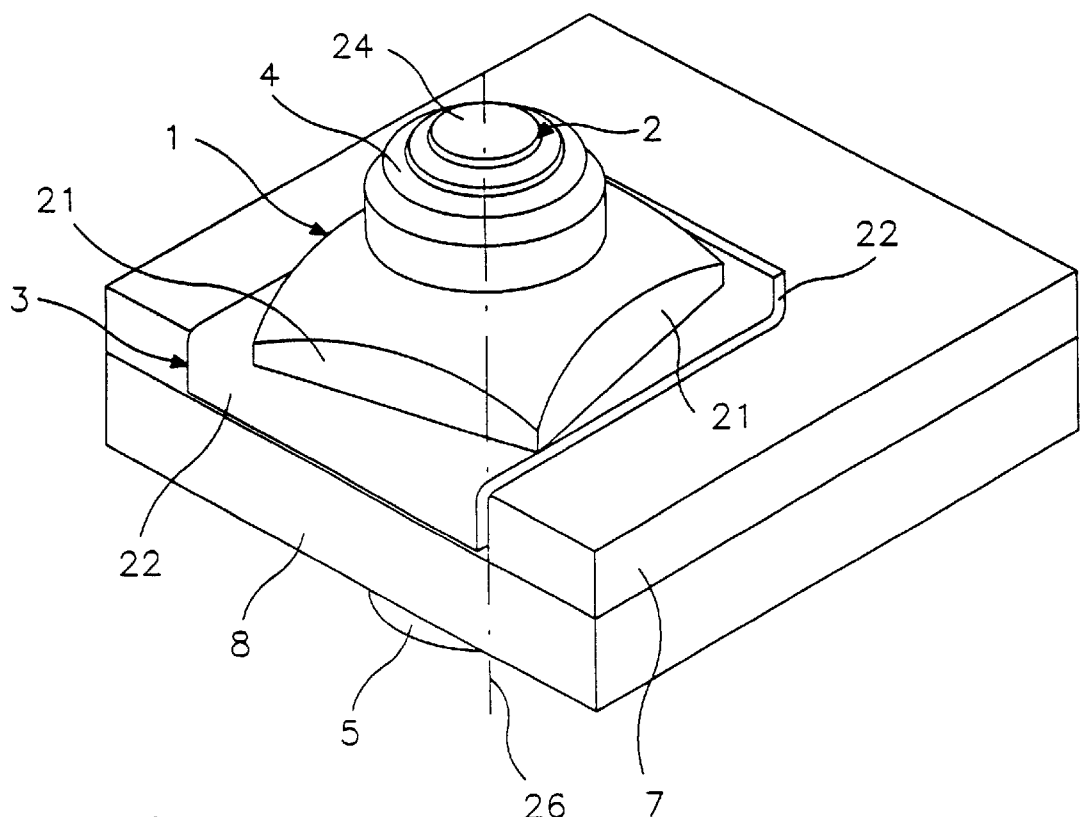
FIG. 4A is a perspective view of FIG. 4.
Figure 5:
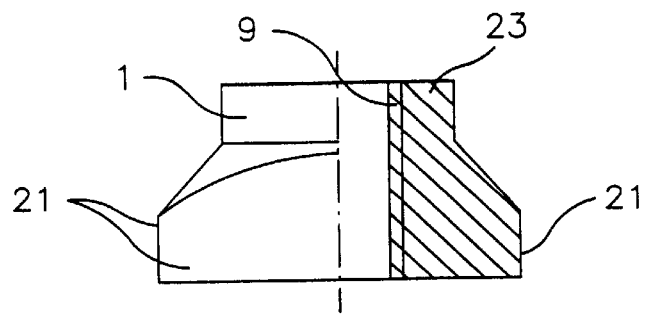
FIG. 5 is a cross sectional view of a nut for the sleeve nut according to the invention.
Figure 6:
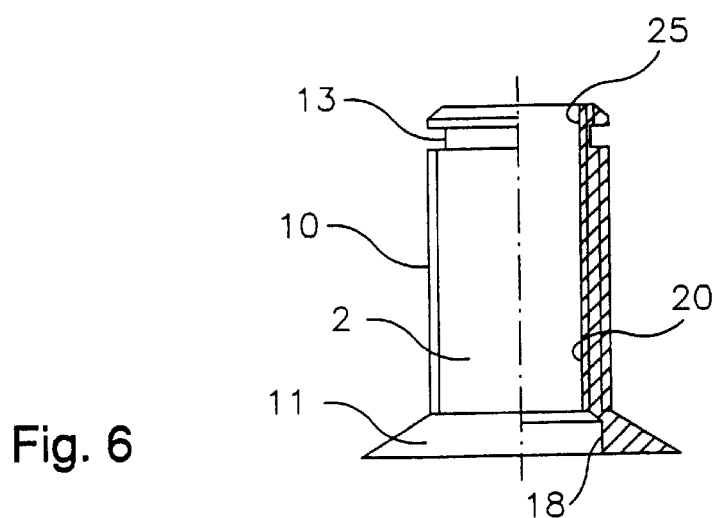
FIG. 6 is a cross sectional view of a sleeve for the sleeve nut according to the invention.
Figure 7:
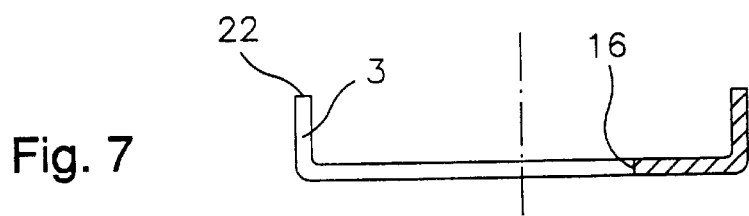
FIG. 7 is a cross sectional view of a socle for a sleeve nut according to the invention.

In-between the nut 1 and the component 7 a socle 3 is inserted. This socle 3 is locked against rotation with respect to the component 7. In the embodiment of FIG. 1 to 3 this is achieved by gluing the socle 3 to the component 7 by an adhesive or an adhesive strip 14. In the embodiment of FIG. 4 the socle 3 is locked against rotation by a tongue 22' bent over an edge of component 7. In this case the socle is positively locked against rotation. The socle 3 may also be fixed by an adhesive or adhesive strip to the component 7. However, an adhesive or adhesive strip is not required in the embodiment shown in FIG. 4. Furthermore the tongue 22' may also be inserted into an orifice of component 7 instead of being bent over an edge.

The nut 1 has the female portion 9 and at least two opposed outer flats 21, preferably four outer flats 21 forming a square. Sleeve 2 is designed screw like with a countersunk head 11 and the male thread or exterior thread 10. At the opposed end of head 11 the sleeve 2 has a circumferential groove 13. A center bore hole of the sleeve 2 is threaded to provide an interior thread or female thread 20 for the screw 5. To make inserting of the screw 5 easier the sleeve 2 has in its area of the head 11 a hole 18 of greater diameter as the female thread 20.

Socle 3 has two tongues 22. In the embodiment of FIG. 1 to 3 both tongues 22 a bent in an upright position. In the embodiment of FIG. 4 one of the tongues 22' is bent down as described above.

To screw the sleeve 2 and the nut 1 together, the sleeve 2 is inserted into a bore hole 15 of the component 7 and a hole 16 of the socle 3. Bore hole 15 of the component 7 and the hole 16 of the socle 3 are of bigger diameter than the outer diameter of the male thread 10 of sleeve 2 but of less diameter than the outer diameter of the countersunk head 11. Bore hole 15 and hole 16 are congruent to each other. Countersink 12 is drilled into the component 7 which is of greater diameter than the countersunk head 11. This allows certain movement of the entire sleeve nut with respect to the component 7. As a result, shearing stress to the adhesive strip 14 while inserting screw 5 is also minimized.

The sleeve nut is assembled as follows.

The socle 3 is placed on the component 7 and glued to it if appropriate. Sleeve 2 is then inserted and screwed to nut 1 (this may be done by hand only). After the sleeve 2 has been screwed into the nut 1 a locking ring 4 is inserted into groove 13. This locking ring 4 prevents the sleeve 2 from turning out of the nut 1. Hence, the sleeve nut now is completely assembled and safely secured from dropping off. Countersunk head 11 lies loosely in countersink 12.

Now another component 8 may be screwed to the first component 7. The screw 5 is inserted into the bore hole 17 of component 8 and screwed with its male thread 19 into the female thread 20 of sleeve 2. Screw 5 can be easily turned until its screw top 24 reaches a deformed area 25 of female thread 20 of sleeve 2. At first the sleeve 2 will be screwed further into the nut 1 until it is finally spanned. The screw 5 now needs to be screwed with higher force until it is completely spanned like shown in FIG. 2 and 4. The deformed area 25 of female thread 20 is a locking member or locking portion insuring that the screw 5 does not work loose from sleeve 2.

When screw top 24 reaches the deformed area 25 this is the latest moment where the nut 1 starts turning around its center line 26 until this is stopped by the flats 21 or the edges there-between come into contact with at least one upright tongue 22 of the socle 3. The nut 1 is now positively locked against further rotation. Screw 5 now may be further screwed in until the recommended torque is achieved.

That an edge between the flats 21 engages the tongue 22 is ensured by the following geometric configuration:

In the embodiment of FIG. 4 the distance d between the center line 26 of the nut 1 is smaller than the half of the width across edges e of the nut 1 (d<e/2). Thereby the width across edges e must be calculated with the biggest possible distance d because of certain movement of the sleeve nut with respect to the component 7 as described above.

In the embodiment of FIG. 1 to 3 the width across edges e which is greater than the width w between the two opposed tongues 22 (w<e).

With increasing tension of the screw connection the adhesive strip 14 will be stressed only with pressure and no longer with shearing stress.

Disassembly of the components 7 and 8 works the other way round. Sleeve 2 together with screw 5 is screwed out of the nut 1 until locking ring 4 engages the nut top 23 of nut 1. The sleeve now is locked against being further screwed out of nut 1 and screw 5 can be screwed out of the sleeve 5.

If the threads 10 and 20 of sleeve 2 or thread 9 are worn out due to regular screwing or there is any other need to change, the sleeve nut may be disassembled by removing locking ring 4 from groove 13 and screwing sleeve 2 out of nut 1.

Figure 8:
FIG. 8 is a top view of a first embodiment of a locking ring for a sleeve nut according to the invention.
Figure 9:
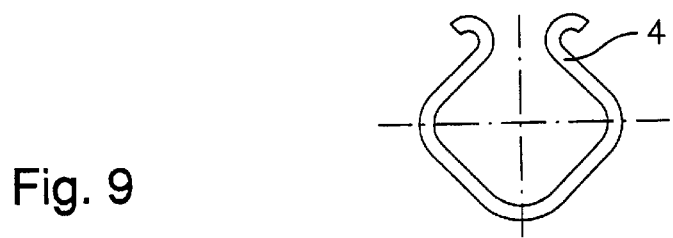
FIG. 9 is a top view of another embodiment of a locking ring for a sleeve nut according to the invention.

The locking ring 4 may be of any suitable shape. For example the locking ring 4 of FIG. 8 is a segment of a circle. The locking ring 4 of FIG. 9 is more formed like a square. Also an O-ring may be used.

While specific embodiments of the invention have been shown and described in detail to illustrate the application of the principles of the invention, it will be understood that the invention may be embodied otherwise without departing from such principles.

What is claimed is:

1. A sleeve nut for a component, the sleeve nut comprising:
   a sleeve having a head on one end and having an opposite end and having an exterior threaded portion and an interior threaded portion;
   a nut screwed on said outside threaded portion; and
   a socle positioned between the component and said nut and locked against rotation with respect to the component, said nut being positively locked against rotation at said socle.

2. The sleeve nut according to claim 1, wherein said socle has an upright tongue positively locking said nut against rotation by blocking upright flat portions of said nut.

3. The sleeve nut according to claim 2, wherein half a width across corners of said nut is greater than a distance between a center line of said nut and said tongue.

4. The sleeve nut according to claim 2, wherein said socle has a second tongue which positively locks said socle against rotation with respect to said component.

5. The sleeve nut according to claim 2, wherein said socle has at least two tongues opposed to each other and wherein said width across corners of said nut is greater than a width between said tongues.

6. The sleeve nut according to claim 1, wherein said socle is fixed to said component by an adhesive.

7. The sleeve nut according to claim 1, wherein said locking device comprises a circumferential groove in said sleeve and a ring inserted into said groove.

8. The sleeve nut according to claim 7, wherein a length of said exterior threaded portion is between said head and said groove of said sleeve to define an axial distance between said ring and a top of said nut.

9. The sleeve nut according to claim 1, wherein said interior threaded portion has a locking portion and a screw is screwed into said sleeve whereby said locking portion prevents said screw from working loose.

10. The sleeve nut according to claim 9, wherein said locking portion is a deformed area of said interior thread.

11. The sleeve nut according to claim 1, wherein said head is a countersunk head.

12. The sleeve nut according to claim 11, wherein said countersunk head is inserted into a countersink of the component and wherein said countersink is deeper than the height of the countersunk head.

13. A sleeve nut and component arrangement, comprising:
   a sleeve having a head on one end and having an opposite end and having an exterior threaded portion and an interior threaded portion;

a nut screwed on said outside threaded portion;

a socle positioned between said component and said nut and locked against rotation with respect to the component, said nut being positively locked against rotation at said socle.

14. The arrangement according to claim 13, wherein said socle has an upright tongue positively locking said nut against rotation by blocking upright flat portions of said nut.

15. The arrangement according to claim 14, wherein half a width across corners of said nut is greater than a distance between a center line of said nut and said tongue.

16. The arrangement according to claim 14, wherein said socle has a second tongue which positively locks said socle against rotation with respect to said component.

17. The arrangement according to claim 14, wherein said socle has at least two tongues opposed to each other and wherein said width across corners of said nut is greater than a width between said tongues.

18. The arrangement according to claim 14, wherein said socle is fixed to said component by an adhesive.

19. The arrangement according to claim 13, further comprising a screw wherein said interior threaded portion has a locking portion and said screw is screwed into said sleeve whereby said locking portion prevents said screw from working loose and wherein said locking portion is a deformed area of said interior thread.

20. The arrangement according to claim 13, wherein said head is a countersunk head and said countersunk head is inserted into a countersink of the component and wherein said countersink is deeper than the height of the countersunk head.

* * * * *